United States Patent

Campbell et al.

(10) Patent No.: US 6,688,208 B2
(45) Date of Patent: Feb. 10, 2004

(54) WORKBENCH HOLDER SYSTEM

(76) Inventors: Stuart M. Campbell, RR1, Site 2A, Box 0, Port Elgin, Ontario (CA), N0H 2C5; Jacqueline M. Campbell, RR1, Site 2A, Box 0, Port Elgin, Ontario (CA), N0H 2C5

( * ) Notice: Subject to any disclaimer, the term of this patent is extended or adjusted under 35 U.S.C. 154(b) by 181 days.

(21) Appl. No.: 09/933,550

(22) Filed: Aug. 20, 2001

(65) Prior Publication Data

US 2003/0024370 A1 Feb. 6, 2003

Related U.S. Application Data

(63) Continuation-in-part of application No. 09/356,653, filed on Jul. 19, 1999, now abandoned.

(51) Int. Cl.[7] .................................................. B27B 11/00
(52) U.S. Cl. .............................. 83/743; 83/745; 83/829
(58) Field of Search ............... 83/745, 829, 435.12–14, 83/743; 33/495–500, 640, 630

(56) References Cited

U.S. PATENT DOCUMENTS

| 2,773,523 | A | * | 12/1956 | Holpa | 83/745 |
|---|---|---|---|---|---|
| 3,913,440 | A | * | 10/1975 | Baker | 83/745 |
| 4,202,233 | A | * | 5/1980 | Larson | 83/745 |
| 4,306,479 | A | * | 12/1981 | Eberhardt | 83/745 |
| 4,608,898 | A | * | 9/1986 | Volk | 83/745 |
| 4,843,728 | A | * | 7/1989 | Francis | 33/640 |
| 5,148,730 | A | * | 9/1992 | McCaw | 83/745 |
| 5,182,975 | A | * | 2/1993 | Warner | 83/745 |
| 5,385,183 | A | * | 1/1995 | Ferranti | 33/430 |
| 5,472,029 | A | * | 12/1995 | Ketch | 33/456 |

* cited by examiner

Primary Examiner—Kenneth E. Peterson
Assistant Examiner—Omar Flores-Sánchez
(74) Attorney, Agent, or Firm—Edward P. Dutkiewicz

(57) ABSTRACT

A workbench holder system configured with a triangular notch in one corner. A cutting guide and a support bracket each have an upper horizontal component and a downwardly extending vertical component coupled to the stop piece. A piece of lumber may be brought in contact with the surface of the stop piece remote from the vertical component of the cutting guide and the lower surface of the horizontal component for the accurate cutting of the lumber.

1 Claim, 5 Drawing Sheets

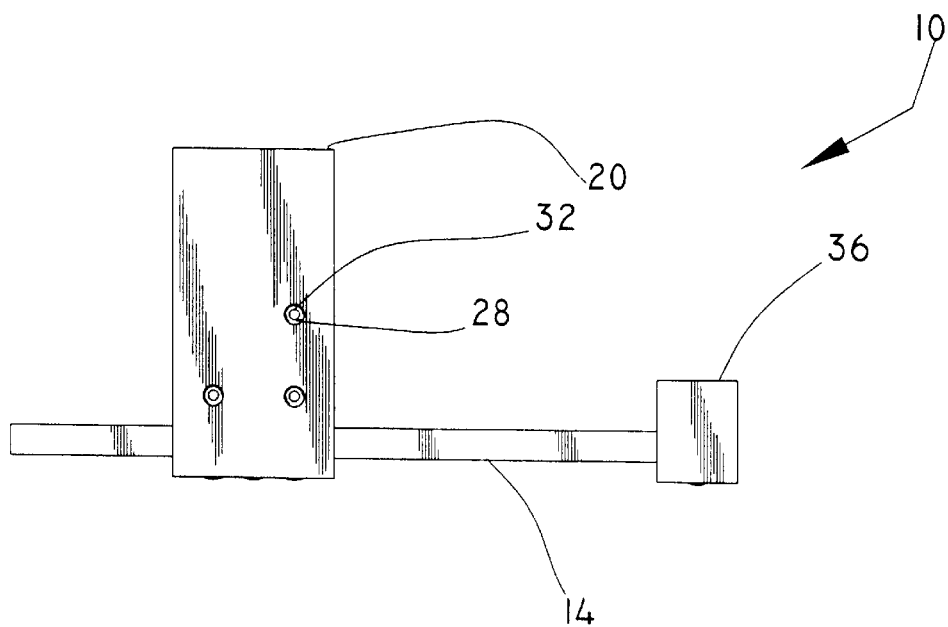
FIG. 5
FIG. 6
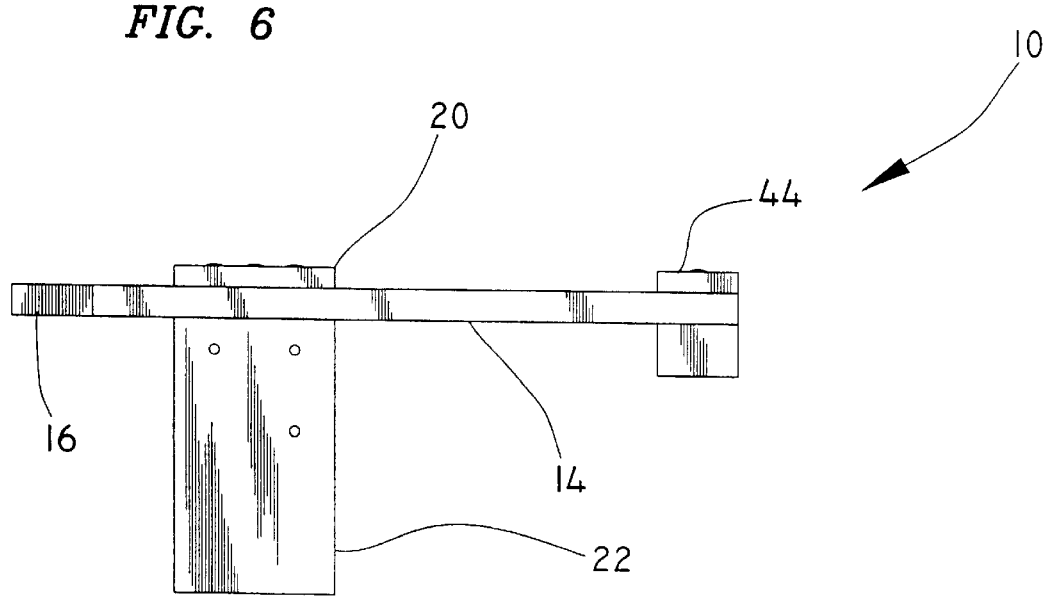

WORKBENCH HOLDER SYSTEM

RELATED APPLICATION

The present application is a continuation-in-part of co-pending application Ser. No. 09/356,653 filed Jul. 19, 1999 now abandoned.

BACKGROUND OF THE INVENTION

1. Field of the Invention

The present invention relates to a new and improved workbench holder system and, more particularly, pertains to a workbench holder system for the cross cut of lumber with an electric hand circular saw and portable workbench.

2. Description of the Prior Art

The use of workbench systems of known designs and configurations is known in the prior art. More specifically, workbench systems of known designs and configurations heretofore devised and utilized for the purpose of facilitating accurate crosscuts in lumber are known to consist basically of familiar, expected, and obvious structural configurations, notwithstanding the myriad of designs encompassed by the crowded prior art which has been developed for the fulfillment of countless objectives and requirements.

The prior art discloses a large number of workbench systems of known designs and configurations. By way of example, U.S. Pat. No. 2,773,523 to Hopla, issued Dec. 11, 1956, discloses a guide device for portable power saws. U.S. Pat. No. 4,056,028 to Patterson, issued Nov. 1, 1977, discloses an apparatus for guiding a portable power saw. U.S. Pat. No. 4,306,479 to Eberhardt, issued Dec. 22, 1981, discloses a portable power driven cutting tool guide. International Publication Number WO 91/01838, published Feb. 21, 1991 to Kirbach et al., discloses a self aligning guide system for one or more circular saw blades. U.S. Pat. No. 5,182,975 to Warner, issued Feb. 2, 1993, discloses a guide for portable power saw. Lastly, U.S. Design Pat. No. 387,782 to Letendre, issued Dec. 16, 1997, discloses a guide assembly for conventional bench saw.

In this respect, the workbench holder system according to the present invention substantially departs from the conventional concepts and designs of the prior art, and in doing so provides an apparatus primarily developed for the purpose of a workbench holder system for the cross cuts of lumber with an electric hand circular saw and portable workbench.

Therefore, it can be appreciated that there exists a continuing need for a new and improved workbench holder system which can be used for a workbench holder system for the cross cuts of lumber with an electric hand circular saw and portable workbench. In this regard, the present invention substantially fulfills this need.

SUMMARY OF THE INVENTION

In view of the foregoing disadvantages inherent in the known types of workbench systems of known designs and configurations now present in the prior art, the present invention provides a newand improved workbench holder system. As such, the general purpose of the present invention, which will be described subsequently in greater detail, is to provide a new and improved workbench holder system and methods which have all the advantages of the prior art and none of the disadvantages.

To attain this, the present invention essentially comprises a new and is proved workbench holder system for the cross cuts of lumber with an electric hand circular saw and portable workbench. The system has, as its first component, a stop piece having a height and a thickness and a length in a generally rectilinear configuration with a triangular notch in the corner. The second component of the system is a cutting guide in an inverted L-shaped configuration having an elongated upper horizontal component and a downwardly extending vertical component. The cutting guide has a plurality of apertures through the vertical component and horizontal component thereof. It is also provided with a plurality of screws coupling the cutting guide to the stop piece and for attachment to a template with the lower surface of the horizontal component in contact with the upper surface of the stop piece adjacent to a first end thereof. The next component of the system is a support bracket in an inverted L-shaped configuration having an elongated horizontal component shorter than the first horizontal component and a downwardly extending vertical component. The support bracket is provided with an aperture through the vertical component thereof with a screw coupling the support bracket to the stop piece with the lower surface of the horizontal component in contact with the upper surface of the stop piece adjacent to a second end thereof. In this manner, a generally rectilinear piece of lumber may be brought in contact with the surface of the stop piece remote from the vertical component of the cutting guides and the lower surface of the horizontal component for the accurate cutting of the lumber.

The stop piece and the vertical components of the cutting guide and support bracket are secured in a portable workbench vise, in a vertical position which varies according to the vertical dimension of the lumber to be cut. In this manner, a generally rectilinear piece of lumber resting on the upper surface of the portable workbench may be brought in contact with the surface of the stop piece remote from the vertical component of the cutting guide and support bracket and the lower surface of the horizontal components thereof for secure holding and the accurate cutting of the lumber.

The lumber may be removed and replaced with another piece of the same vertical dimension without releasing the workbench holder system from the portable workbench vise. The workbench holder system thus facilitates the repetitious cutting of lumber of the same vertical dimension. Furthermore, by adjusting the vertical Position of the workbench holder system in the portable workbench vise, lumber of different vertical dimensions within the capacity of the workbench holder system may be securely held and accurately cut.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved workbench holder system which has all the advantages of the prior art workbench systems of known designs and configurations and none of the disadvantages.

It is another object of the present invention to provide a new and improved workbench holder system which may be easily and efficiently manufactured and marketed. It is a further object of the present invention to provide a new and improved workbench holder system which is of a durable and reliable construction.

An even further object of the present invention is to provide a new and improved workbench holder system which is susceptible of a low cost of manufacture with regard to both materials and labor, and which accordingly is then susceptible of low prices of sale to the consuming public, thereby making such a workbench holder system economically available to the buying public.

Even still another object of the present invention is to provide a workbench holder system for the cross cuts of lumber with an electric hand circular saw and portable workbench.

Lastly, it is an object of the present invention to provide a workbench holder system. The workbench holder system comprises a stop piece in a generally rectilinear configuration with a triangular notch in one corner. The system also includes a cutting guide and support bracket each having an upper horizontal component and a downwardly extending vertical component coupled to the stop piece whereby a piece of lumber may be brought in contact with the surface of the stop piece remote from the vertical component of the cutting guide and the lower surface of the horizontal component for the accurate cutting of the lumber.

These together with other objects of the invention, along with the various features of novelty which characterize the invention, are pointed out with particularity in the claims annexed to and foming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top elevational view of the device shown in the prior figures.

FIG. 6 is a bottom elevational view of the device shown in the prior figures.

The same reference numerals refer to the same parts throughout the various Figures.

DESCRIPTION OF THE PREFERRED EMBODIMENT

Figure 1:
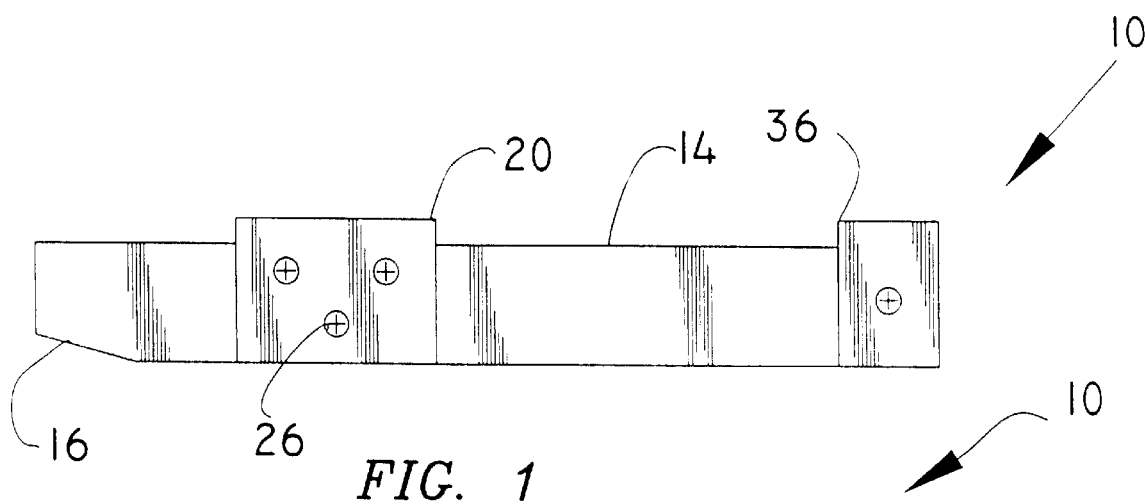
FIG. 1 is a side elevational view of the new and improved workbench holder system constructed in accordance with the principle of the present invention.
Figure 2:
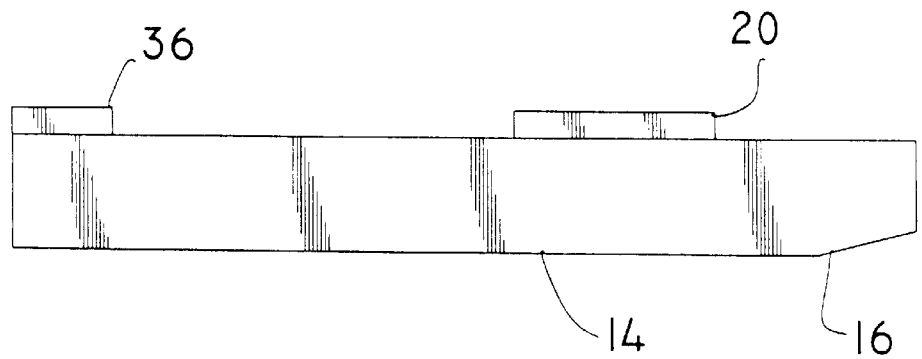
FIG. 2 is a side elevational view of the device shown in FIG. 1 taken from the opposite side thereof.
Figure 3:
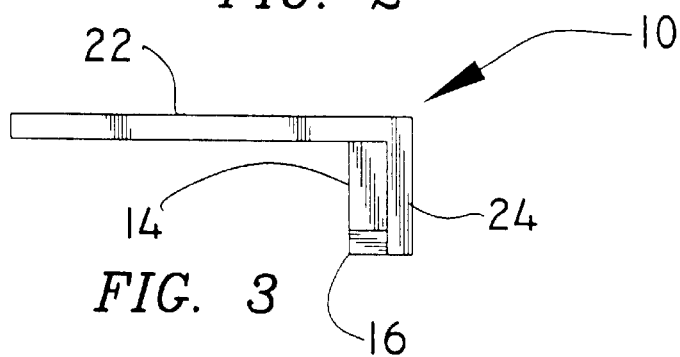
FIG. 3 is a front end elevational view of the device shown in the prior figures.
Figure 4:
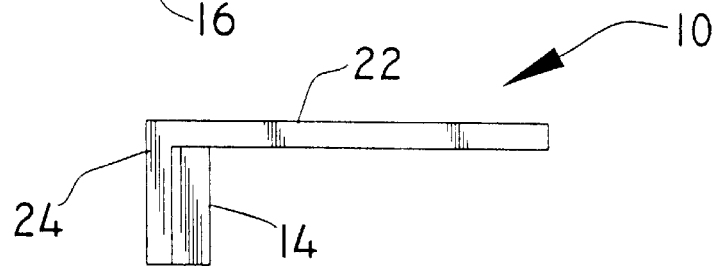
FIG. 4 is an end elevational view of the device shown in the prior figures.

With reference now to the drawings, and in particular to FIGS. 1 through 7 thereof, the preferred embodiment of the new and improved workbench holder system embodying the principles and concepts of the present invention and generally designated by the reference numeral 10 will be described.

The present invention, the new and improved workbench holder system 10, is comprised of a plurality of components. Such components, in their broadest context, include a stop piece and a cutting guide. Each of the individual components is specifically configured and correlated one with respect to the other so as to attain the desired objectives.

The first component of the present invention is a stop piece 14. The stop piece has a height and a thickness and a length in a generally rectilinear configuration. It is also provided with a triangular notch 16 in the corner.

The next component of the system is a cutting guide 20. The cutting guide 20 is formed in an inverted L-shaped configuration. The guide has an elongated upper horizontal component 22 and a downwardly extending vertical component 24. The cutting guide also has a plurality of apertures 26, 28. The apertures are formed through the vertical component and horizontal component thereof. A plurality of screws 30, 32 couples the cutting guide to the stop piece. This arrangement also provides for attachment to a template with the lower surface of the horizontal component in contact with the upper surface of the stop piece adjacent to a first end thereof.

A support bracket 36 is next provided. The support bracket is formed in an inverted L-shaped configuration. The support bracket has an elongated horizontal component 38 shorter than the first horizontal component and a downwardly extending vertical component 40. Also provided is an aperture 42 in the support bracket through the vertical component thereof. A screw 44 couples the support bracket to the stop piece with the lower surface of the horizontal component in contact with the upper surface of the stop piece adjacent to a second end thereof.

The vertical components of the stop piece, cutting guide and support bracket each have lower extents 48, 50 for being secured in a portable workbench vise. In this manner, a generally rectilinear piece of lumber may be brought in contact with the surface of the stop piece remote from the vertical component of the cutting guides and the lower surface of the horizontal component for the accurate cutting of the lumber.

Figure 7:
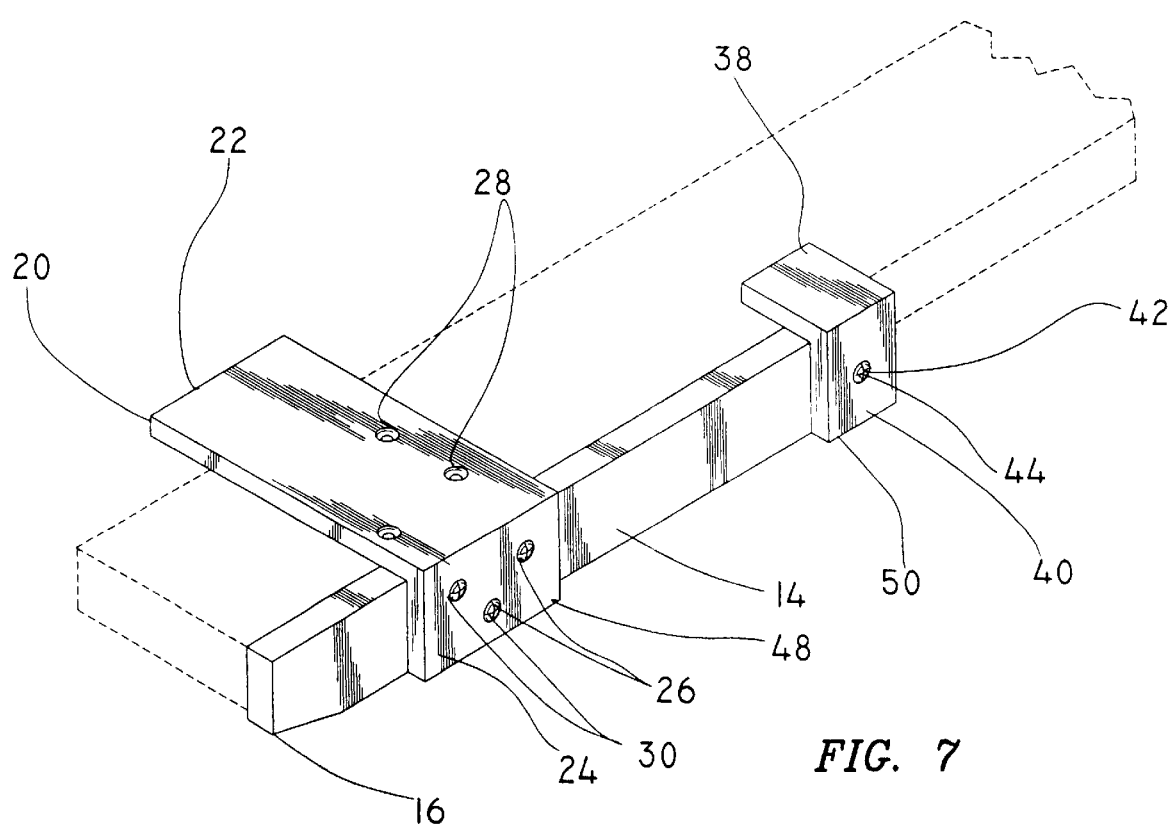
FIG. 7 is a perspective illustration of the device shown in the prior figures.
Figure 8:
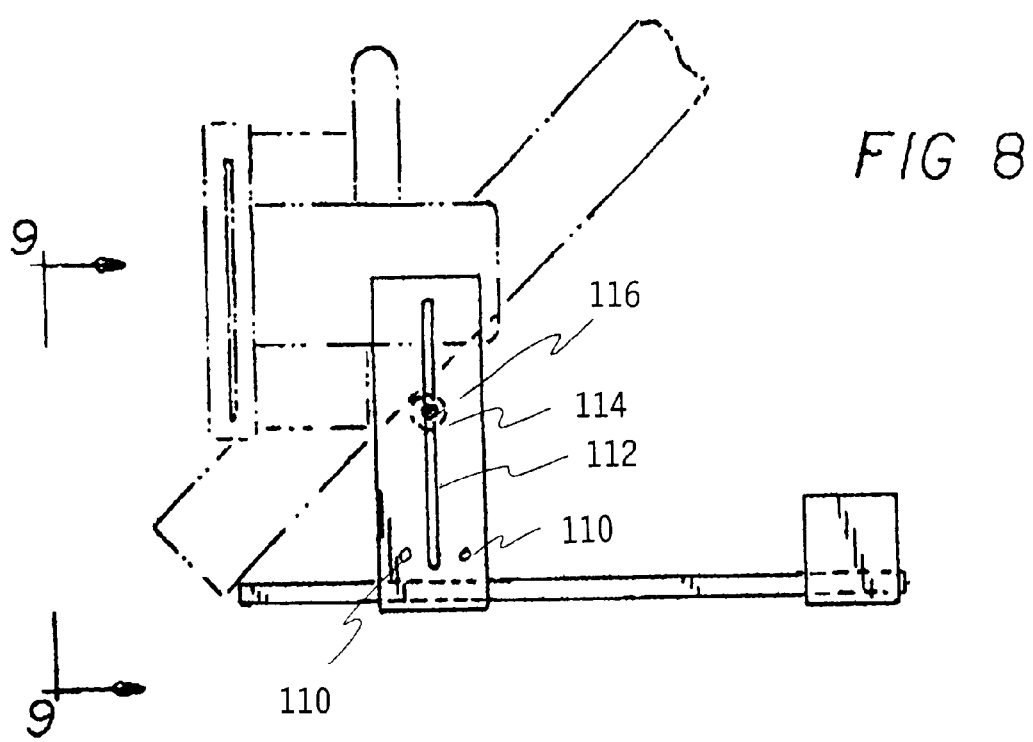
FIG. 8 is a top plan view of an alternate embodiment of the invention.
Figure 9:
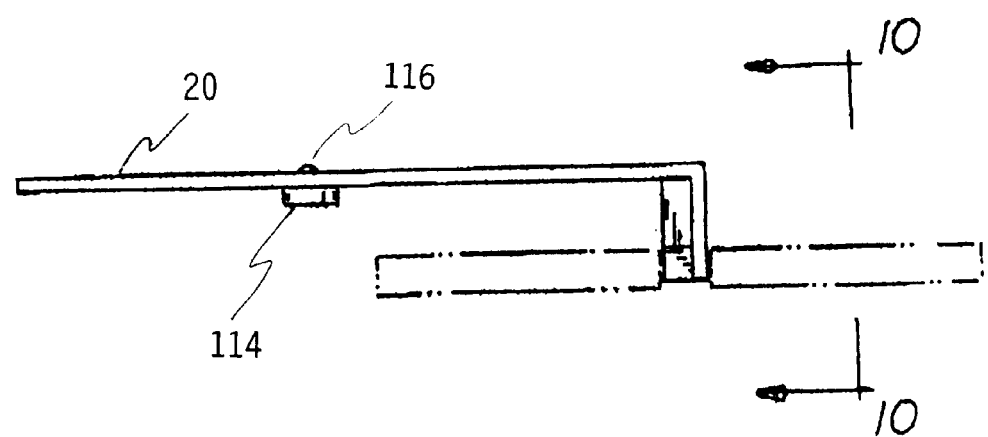
FIG. 9 is a side elevational view taken along line 9—9 of FIG. 8.
Figure 10:
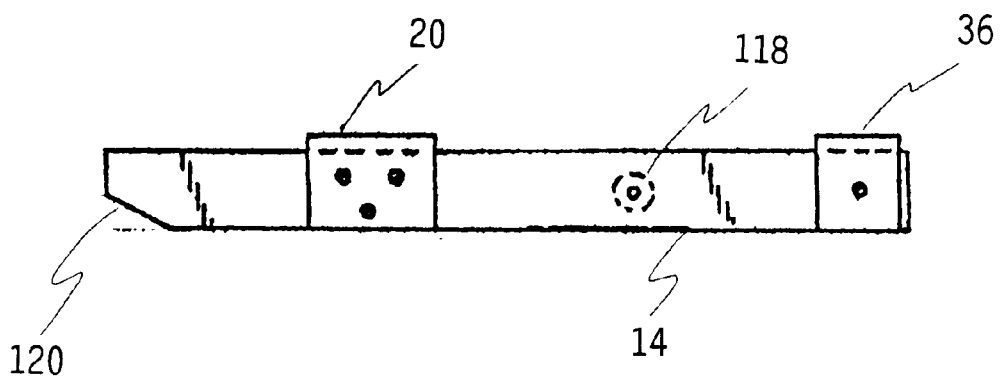
FIG. 10 is an end elevational view taken along line 10—10 of FIG. 9.
Figure 11:
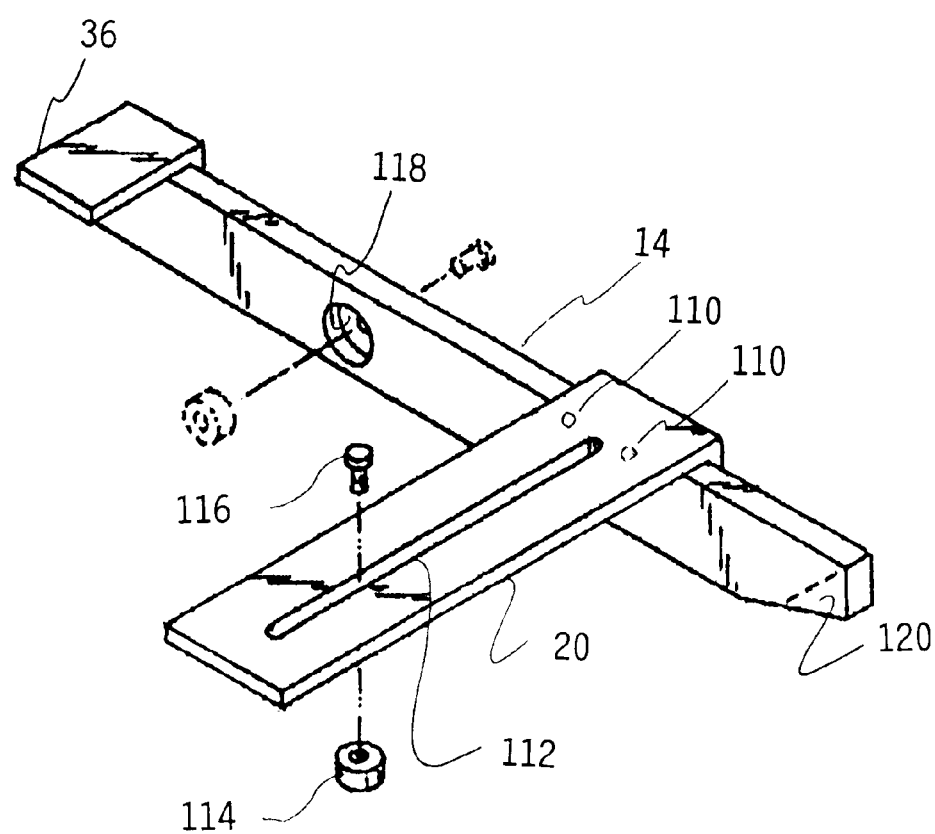
FIG. 11 is an exploded perspective view of the alternate embodiment of FIGS. 8–10.

As can be understood with particular reference to FIG. 7, the stop piece, cutting guide and support bracket have a larger vertical dimension than the lumber being cut. Thus, the lower portion of these components is secured in the vise, so that the workbench holder rests snugly over the lumber. If "thinner" lumber is being cut, the workbench holder sits lower in the vise. This feature of the invention is unique, and avoids the complexities and safety hazards of the prior art.

It is also possible to use the present invention in association with templates such as those made by the user for miter, bevel or compound (a combination of miter and bevel) cuts. This extends the utility of the invention. Consider, for example, the use of a triangular block located beneath the interior region of the cutting guide with one linear edge in flush contact with the stop piece. An opposite linear edge could function as a guide surface for positioning a piece of lumber there against for being cut at an angle from its axis by a saw being guiding by the edge of a cutting guide.

The system of the present invention is a cutting guide for use with an electric hand circular saw and portable workbench which facilitates quick and easy accurate crosscuts in lumber, square and to length.

The system consists of a stop piece, a cutting guide and a support bracket. The preferred embodiment might employ a cutting guide and support bracket made of molded plastic, cast metal, or formed sheet metal. The stop piece incorporates a cut line indicator which shows the user where to position the cutting mark on the lumber for an accurate cut. When the system is used for the first time, the user trims the stop piece with the saw to form the cut line indicator for all future cutting with that saw. This feature adds to the convenience, speed and accuracy of cutting lumber using the present system.

The system secures the lumber in addition to guiding the circular saw, providing a safety advantage over conventional methods of cutting lumber at a job site. It is placed over the lumber with the stop piece secured in the portable workbench vise. The lumber is positioned against the stop piece with the cutting mark at the cut line indicator, thus holding it securely while the circular saw is run along the cutting guide edge. Lumber of the same thickness can be repeatedly positioned under the cutting guide, cut to length, and removed, without adjusting the system within the workbench vise.

Without the use of the system of the present invention, considerable skill and patience is required to make accurate, square crosscuts. The use of the system of the present invention saves materials by eliminated skewed cuts, thus saving time and money.

An alternate embodiment of the invention is shown in FIGS. 8–11. This improvement avoids the need to pre-cut a template and secure it under the cutting guide to position the workpiece for miter cuts. The improvement has the further advantage of being infinitely adjustable within the capacity of the workbench holder system.

One of the three screw holes 28 is removed from the horizontal portion of the cutting guide. This hole is no longer necessary, as the template formerly used for cutting miters is not required. The remaining two screw holes 110 are left available to secure a temporary block against the stop piece for any special operations that the user desires.

A slot 112 in the cutting guide allows a button 114 to be secured under the cutting guide by a screw 116 at any position along the length of the slot The button is approximately 1 inch in diameter by 0.25 inch deep, and has an internal screw thread. When the button is not in use for cutting miters, it is stored in a recess 118 in the stop piece. The dimensions of the recess match those of the button. A plain hole in the enter of the recess extends through the remaining thickness of the stop piece so that the screw 116 can be inserted from the opposite side of the stop piece to secure the button in the recess.

When the user wants to cut a miter, the workpiece is positioned under the cutting guide at the desired angle, with the edge of the workpiece touching the corner 120 of the stop piece. The button is then secured under the slot so that it touches one edge of the workpiece. This arrangement allows the user to repeatedly position and cut workpieces at the same angle.

The workbench holder system can also be used for bevel and compound cuts, a combination of miter and bevel cuts. In this case, the edge 128 of the stop piece, instead of being vertical as shown in the sketch, is cut at an angle to the vertical that matches the desired bevel angle. This alternative arrangement is shown by a dashed line. Once the stop piece is cut in this manner, the workbench holder system may be used for "square" bevel cuts (without using the button), or compound cuts (with the button in use).

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A workbench holder system for the cross cuts of lumber with an electric hand circular saw and portable workbench comprising, in combination:

a stop piece having a height and a thickness and a length in a generally rectilinear configuration with corners and with a triangular notch in one corner;

a cutting guide and a support bracket each having an inverted L-shaped configuration having an elongated horizontal component with an upper surface and a lower surface and a downwardly extending vertical component, the cutting guide having a plurality of apertures through the vertical component and horizontal component thereof with a plurality of screws coupling the cutting guide to the stop piece and with the lower surface of the horizontal component in contact with the upper surface of the stop piece adjacent to a first end thereof;

the support bracket being in an inverted L-shaped configuration having an elongated horizontal component with an upper surface and a lower surface and of a length shorter than the horizontal component of the cutting guide and a downwardly extending vertical component, the support bracket having an aperture through the vertical component thereof with a screw coupling the support bracket to the stop piece with the lower surface of the horizontal component in contact with the upper surface of the stop piece adjacent to a second end thereof;

a slot formed in the horizontal component of the cutting guide with a screw positionable through the slot at any position along the length of the slot and with a button secured to the cutting guide by the screw;

a recess in the stop piece for the receipt and storage of the button;

the stop piece and the vertical components of the cutting guide and support bracket all having downwardly extending portions adapted to be secured in a portable workbench vise whereby a generally rectilinear piece of lumber may be brought in contact with the stop piece remote from the vertical components of the cutting guide and the support bracket and the lower surfaces of the horizontal components of the cutting guide and the support bracket for the accurate cutting of lumber.

* * * * *